(12) United States Patent
Griffin

(10) Patent No.: US 7,679,322 B1
(45) Date of Patent: *Mar. 16, 2010

(54) AUXILIARY POWER ADAPTER HAVING DEVICE CONTROLS

(75) Inventor: Paul Griffin, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 345 days.

This patent is subject to a terminal disclaimer.

(21) Appl. No.: 11/367,622

(22) Filed: Mar. 3, 2006

(51) Int. Cl.
*H02J 7/00* (2006.01)
*H04B 1/08* (2006.01)
*H04B 1/38* (2006.01)
*F21L 4/00* (2006.01)

(52) U.S. Cl. .................. 320/114; 455/347; 455/573; 362/183

(58) Field of Classification Search .................. 320/114; 455/347

See application file for complete search history.

(56) References Cited

U.S. PATENT DOCUMENTS

| | | | |
|---|---|---|---|
| 5,371,453 A | 12/1994 | Fernandez | 320/136 |
| 5,821,736 A | 10/1998 | Yeon | 320/148 |
| 6,025,698 A | 2/2000 | Kim et al. | 320/132 |
| 6,087,805 A | 7/2000 | Langston et al. | 320/109 |
| 6,127,810 A | 10/2000 | Sato et al. | 320/148 |
| 6,215,276 B1 * | 4/2001 | Smith | 320/111 |
| 6,424,122 B2 | 7/2002 | Yagi et al. | 320/132 |
| 6,504,341 B2 | 1/2003 | Brotto | 320/106 |
| 6,747,436 B2 | 6/2004 | Brotto | 320/106 |
| 6,844,702 B2 | 1/2005 | Giannopoulos et al. | 320/108 |
| 2002/0132651 A1 * | 9/2002 | Jinnouchi | 455/573 |

\* cited by examiner

*Primary Examiner*—Edward Tso
*Assistant Examiner*—Yalkew Fantu
(74) *Attorney, Agent, or Firm*—Hornkohl Intellectual Property Law PLLC; Jason L. Hornkohl

(57) ABSTRACT

An accessory for a portable electronic device, such as a digital music player, includes a set of device controls for controlling the portable electronic device. The accessory includes a microprocessor and a memory that contains function codes corresponding to the functions selected by the controls. In response to user manipulation of the controls, the accessory sends the function codes to the portable electronic device that cause the device to perform the requested function. Preferably, the accessory is a charger is adapted to be inserted into for a 12-volt car auxiliary power outlet and has the controls on the protruding face of the charger body. The accessory may also include an FM transmitter for transmitting an audio signal received from the portable electronic device to the car stereo.

22 Claims, 2 Drawing Sheets

AUXILIARY POWER ADAPTER HAVING DEVICE CONTROLS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

FIELD OF THE INVENTION

The present invention is generally directed toward the field of accessories for portable electronic devices. More particularly, an embodiment of the present invention is directed toward an accessory for a digital music player that is adapted be mounted in an auxiliary power outlet and has controls for the digital music player on the accessory body.

BACKGROUND OF THE INVENTION

Many digital music players, such as MP3 players, use 12-volt auxiliary power adapters for charging the player while in the car. The adapter is inserted in the 12-volt car outlet and is plugged into the player through its docking port or input connector to charge the player's battery. The user may place the player in the passenger seat or a holder and listen to music while the player charges. However, if the listener wants to skip a song or pause the player, the listener must locate the player and manipulate its controls. Unfortunately, digital music players are often very small and have small control knobs that are difficult to operate when driving a car. Therefore, what is needed is a new way to control a digital music player when charging it in your car.

BRIEF SUMMARY OF THE INVENTION

An embodiment of the present invention is directed toward a charger for a digital music player. The charger includes a charger body having a set of controls whereby a user can manipulate a function of the digital music player by using the set of controls. The charger body is adapted to fit in a 12-volt car outlet and the controls are positioned on an end face of the charger body. A function code memory in the charger contains the codes required to control the digital music player. The charger preferably has controls that allow a user to pause, play, rewind, or skip songs played by the digital music player. The charger is coupled to the digital music player through a cable and accessory port connector. A transmitter may be provided in the charger body that broadcasts a signal received from the digital music player to a remote receiver.

Another embodiment of the present invention is directed toward an accessory for a portable electronic device. The accessory includes an interface whereby the accessory can transfer control codes to the portable electronic device in response to a user input on the accessory such that a user can implement functions on the portable electronic device with the controls on the accessory. Preferably, the accessory communicates with operating software of the portable electronic device such that the accessory can control the functions of the portable electronic device. The accessory is adapted to fit in a 12-volt car outlet and the controls are positioned on an end face of the charger so as to be accessible to the driver and passengers of the car. The accessory may be directly coupled to the portable electronic device through a cable or wirelessly through an RF transceiver. The accessory may also include a microphone such that a voice signal can be received with the microphone and stored on the portable electronic device Yet another embodiment of the present invention is directed toward a method of controlling a portable electronic device, such as a digital music player, with a charger. In accordance with the method, a set of user inputs is provided on the charger. Control codes are transferred from the charger to the portable electronic device in response to manipulation of the user inputs such that a function of the portable electronic device is controlled by the user inputs on the charger. The control codes also enable the charger to modify a display of the electronic device. An audio signal is received from the portable electronic device with the charger and the audio signal is transmitted from the charger to a remote receiver.

DETAILED DESCRIPTION OF THE INVENTION

Figure 1:
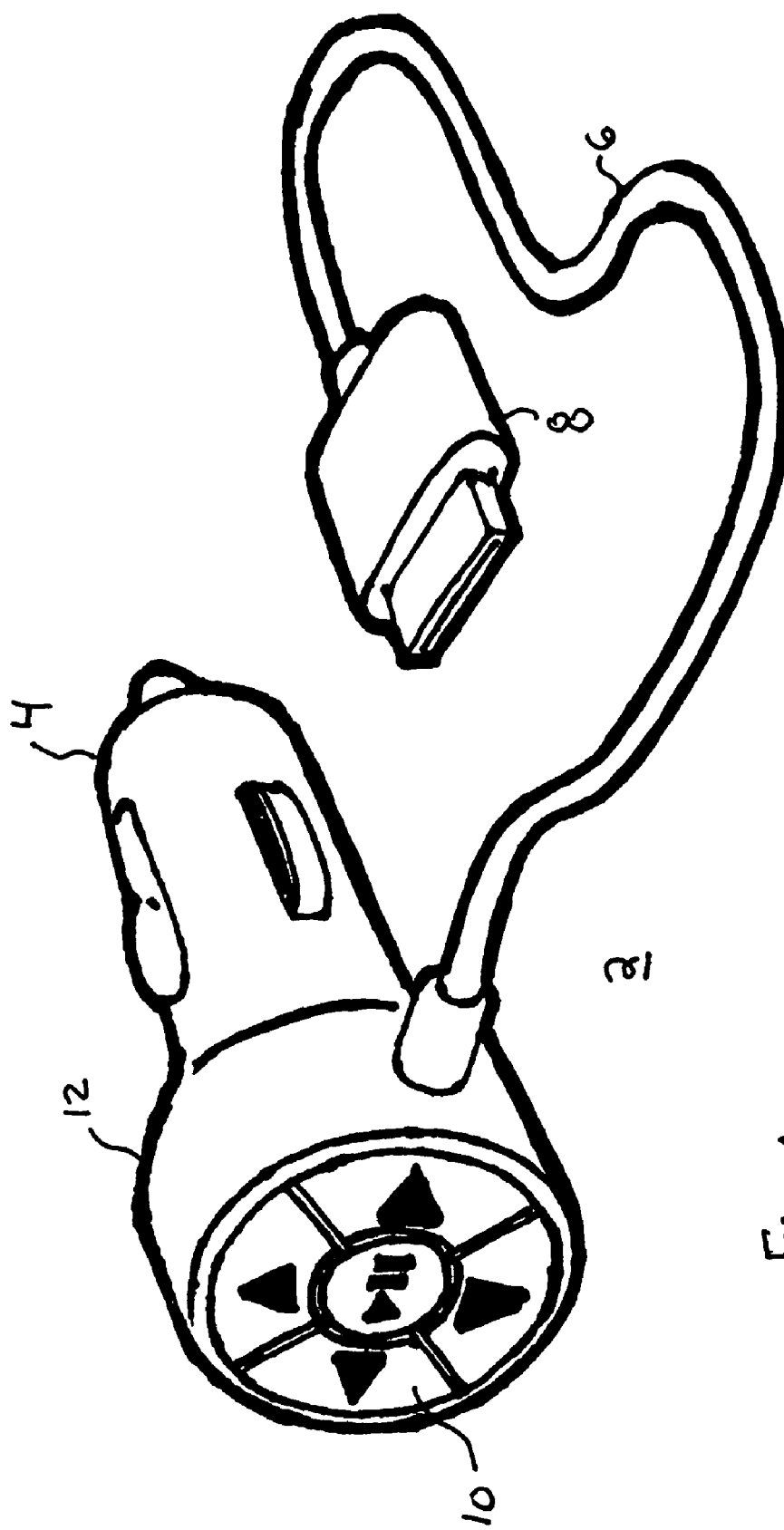
FIG. 1 is an illustration of a car charger for a portable electronic device constructed in accordance with an embodiment of the present invention.

Referring to FIG. 1, an illustration of car charger 2 for a portable electronic device constructed in accordance with an embodiment of the present invention is shown. The car charger 2 has body portion 4 that is adapted to be inserted into the 12-volt auxiliary power output, i.e., cigarette lighter, of an automobile. The charger body 4 transfers power from the power outlet to the portable electronic device through a cable 6 with a connector 8 that is adapted to be coupled to the device. A series of user controls 10, preferably buttons, are positioned on the upper face 12 of the body portion 4. These controls 10 are used to control functions, such as play, pause, volume, etc. of the portable electronic device. This is accomplished by positioning a microprocessor in the adapter body 4 that is able to communicate with the electronic device through a communication link that is bundled in the cable 6 with the wire used to carry power to the device. In an alternative embodiment of the present invention, the adapter body 4 may communicate with the electronic device through the use of a wireless RF frequency data link. However, a direct coupling will be required if a charging function is desired in the charger body 4. When a user presses a button 10 on the charger body 4, the microprocessor retrieves a code associated with the selected function from a memory and sends the code to the electronic device through a connection in the cable 6. The device then performs the requested function. A most preferred set of controls 10 is a play, pause, rewind, skip and stop and a volume up/down for a digital music player to which the device is coupled. However, the controls 10 could be varied to any desired control that was relevant to the device which the charger 2 is used with. A display 14 may also be included on the face 12 that displays a status of the device to which the charger 2 is coupled.

In an alternative embodiment, the charger may include a transmitter for transmitting a signal received from the electronic device over the cable 6 to a remote receiver. For example, an FM transmitter can be included such that an audio signal received by the charger 2 from a digital music player can be broadcast from the charger 2 to the car radio. In such an embodiment, the controls for the transmitter are also placed on the top of the body portion 4 of the charger along with the controls 10 for the digital music player.

Figure 2:
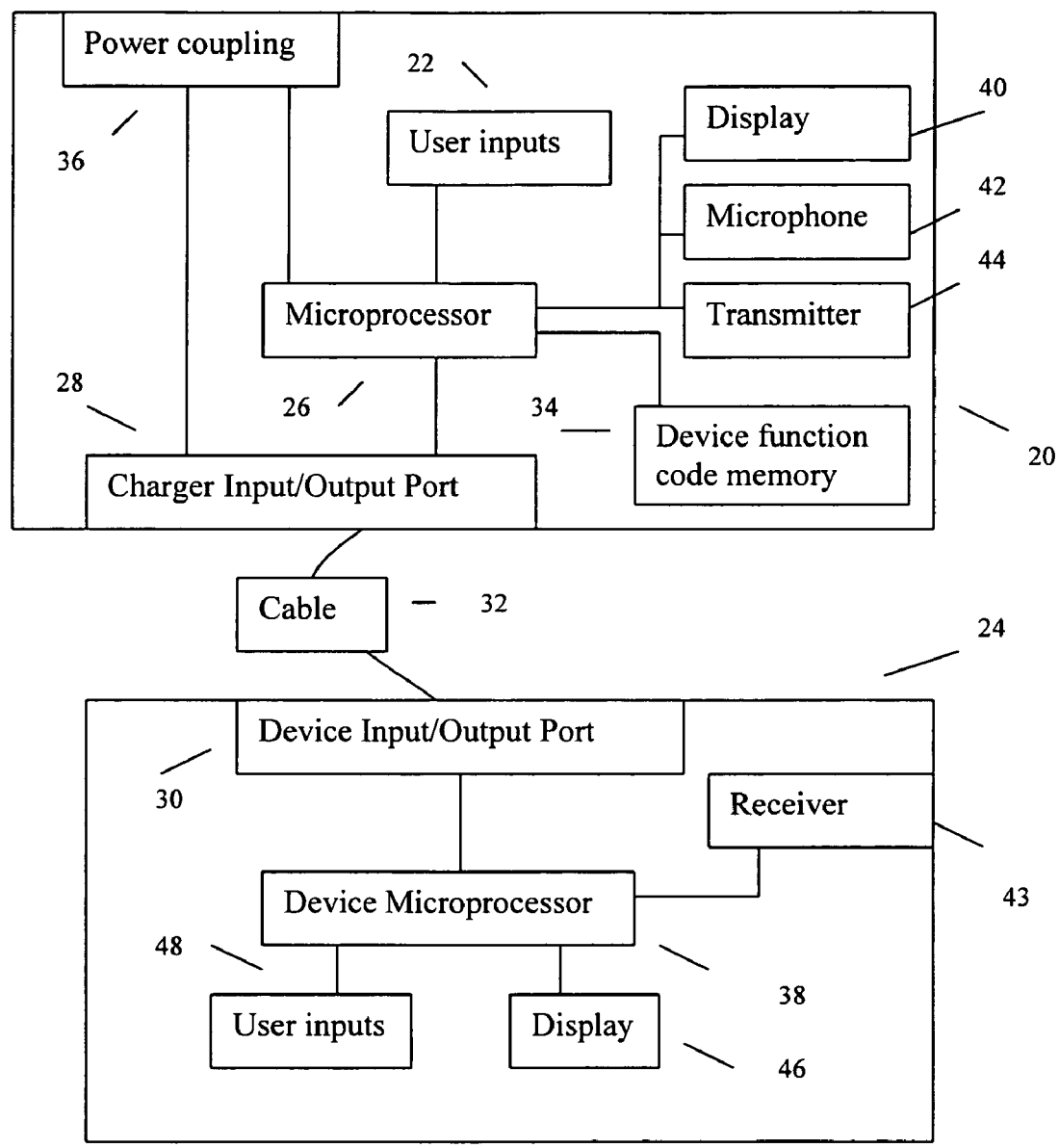
FIG. 2 is a block diagram of an accessory constructed in accordance with an embodiment of the present invention.

Referring now to FIG. 2, a block diagram of a charging accessory 20 having device controls 22 for a portable electronic device 24 constructed in accordance with an embodiment of the present invention is shown. The charger 20 is controlled by a microprocessor 26 that communicates with the device 24 through a charger input/output port 28 connected to cable 32 which couples to the device's input/output port 30 through a connector. For example, when used in conjunction with an iPod digital music player, the communication interface would be implemented through the 30-pin docking connector. The charger 20 is adapted to be coupled to a power source such as 12-volt car outlet through a power coupling 36 and ports 28 and 30 to the device 24. The charging accessory 20 includes a user input 22, such as a play button, that is manipulated by a user to select the play function of the device 24. The accessory 20 uses a function code memory 34 to store the codes that allow it to control the functions of the attached device. These codes are transferred to the device 24 through the cable 32. The device microprocessor 38 receives and interprets the codes and performs the functions corresponding to the received codes. Thus, if the device 16 is a digital music player such as an Apple iPod™, a user can use the charging accessory user inputs 22 to control the standard functions of the digital music player such as play, pause, rewind, fast forward, etc. However, a user can still use the device controls 48 if they prefer. Preferably, the charging accessory 20 is configured such that a user can just connect it to the portable electronic device 24 and power outlet and begin controlling the device without any additional required set-up. The charger also preferably includes a display 40 for displaying status information related to the requested functions such as the artist and title of the track currently playing. In addition, the charger microprocessor 26 can send codes to the device 24 such that a display 46 of the device 24 is altered or controlled.

In an alternative embodiment, the charger 20 may include a microphone 42 for detecting sound waves and producing an output signal based thereon. The output signal of the microphone 42 may be sampled by the microprocessor 26 to produce a digital data file which is transferred to the electronic device 24, or the analog signal from the microphone 42 may be provided directly to the device 24 itself depending upon the device's capabilities and the interface available. The device 24 then stores the data file in device memory for later retrieval. When so equipped, the charger 20 can then function as a voice recorder.

In yet another alternative embodiment, the charging accessory 20 includes a transmitter 44 that allows the accessory 20 to broadcast an audio signal received from the device 24 to a remote receiver such as a car radio. In such an embodiment, the transmitter 20 receives an output audio signal from the portable electronic device 24 and broadcast the signal to a remote receiver such that the output signal from the portable electronic device 24 is transferred to the remote receiver. The controls 22 on the accessory 20 are then used to control the music playing on the remote receiver.

In yet another embodiment, a transmitter 44 in the accessory can be used to establish a communication link with a receiver 43 in the device 24. The control codes can then be transmitted wirelessly from the accessory 20 to the device 24. However, as will be appreciated by those skilled in the art, if the device 24 and accessory 20 are not directly coupled, the accessory 20 will not be able to charge the device 24. In addition, the device 24 must be equipped with a receiver 43 to wirelessly receive data.

While the particular designs discussed above with respect to FIGS. 1 and 2 are preferred, it will be readily appreciated by those skilled in the art that embodiments of the present invention can take many forms and that the embodiments shown are exemplary only. Thus, although there have been described particular embodiments of the present invention of a new and useful Auxiliary Power Adapter Having Device Controls, it is not intended that such references be construed as limitations upon the scope of this invention except as set forth in the following claims.

What is claimed is:

1. A charger for a digital music player comprising:
 a unitary charger body having a set of controls whereby a user can manipulate a function of said digital music player by using said set of controls wherein a lower portion of said unitary charger body is adapted to fit in a 12-volt car outlet and said set of controls are positioned on an upper portion on said unitary charger body that extends from said 12-volt car outlet.

2. The charger of claim 1 wherein said charger has controls that allow a user to pause, play, rewind, or skip songs played by said digital music player.

3. The accessory of claim 1 wherein said charger further comprises a function code memory.

4. The accessory of claim 1 wherein said charger further comprises an FM transmitter for broadcasting a signal received from said digital music player to a remote receiver.

5. The charger of claim 1 wherein said controls are positioned on an end face of said charger body.

6. The charger of claim 1 wherein said charger is coupled to said digital music player through a cable and accessory port connector.

7. An accessory for a portable electronic device, said accessory comprising:
 an interface whereby said accessory can transfer control codes to said portable electronic device in response to a user input on said accessory such that a user can implement functions on said portable electronic device with said user inputs on said accessory; and
 wherein said accessory has a housing with a lower portion that is adapted to fit in a 12-volt car outlet and an upper portion firmly coupled to said lower portion and said user input is positioned on said upper portion.

8. The accessory of claim 7 wherein said portable electronic device further comprises a digital music player.

9. The accessory of claim 7 wherein said user inputs are positioned on an end face of said upper portion of said housing.

10. The accessory of claim 7 wherein said accessory further comprises an FM transmitter for wirelessly transmitting said control codes to a receiver in said portable electronic device.

11. The accessory of claim 1 wherein said device is a digital music player and said accessory has controls that allow a user to pause, play, rewind, or skip songs played by said digital music player.

12. The accessory of claim 8 wherein said accessory communicates with operating software of the digital music player such that the charger can control the functions of the digital music player.

13. The accessory of claim 7 further comprising a microphone such that a voice signal can be received with said microphone and stored on said portable electronic device.

14. A method of controlling a portable electronic device with a charger having a lower portion adapted to fit in a 12-volt car outlet and an upper portion securely connected to said lower portion that extends from said 12-volt car outlet when said lower portion is mounted in said 12-volt car outlet comprising:

provided a set of user inputs on said upper portion of said charger and transferring control codes from said charger to said portable electronic device in response to manipulation of said user inputs such that a function of said portable electronic device is controlled by said user inputs on said charger.

15. The method of claim 14 further comprising receiving an audio signal from said portable electronic device with said charger and transmitting said audio signal from said charger to a remote receiver.

16. The method of claim 14 wherein said portable electronic device is a digital music player.

17. The method of claim 14 wherein the charger is adapted to fit in a 12-volt car outlet and said controls are positioned on an end face of said charger.

18. The method of claim 15 wherein said portable electronic device is an iPod.

19. The method of claim 14 wherein said control codes enable said charger to modify a display of said electronic device.

20. The method of claim 14 wherein said charger has controls that allow a user to pause, play, rewind, or skip songs played by said portable electronic device.

21. A charger for a portable electronic device comprising:

a charger body adapted to fit in a 12-volt car outlet having a set of controls positioned on a upper portion of the charger body that extends from the 12-volt car outlet when the charger body is inserted into the 12-volt car outlet whereby a user can manipulate a function of said portable electronic device including at least one of a pause, play, rewind, or skip audio track function by using said set of controls; and a flexible cable extending from said upper portion of the charger body having a connector positioned on one end thereof for electrically coupling said portable electronic device to said charger body.

22. The charger of claim 1 further comprising an audio output means for transferring audio from said portable electronic device to a car receiver.

\* \* \* \* \*